April 15, 1958     R. M. LONG     2,830,369
APPARATUS FOR VENTING CARDBOARD CONTAINERS
Filed March 30, 1955
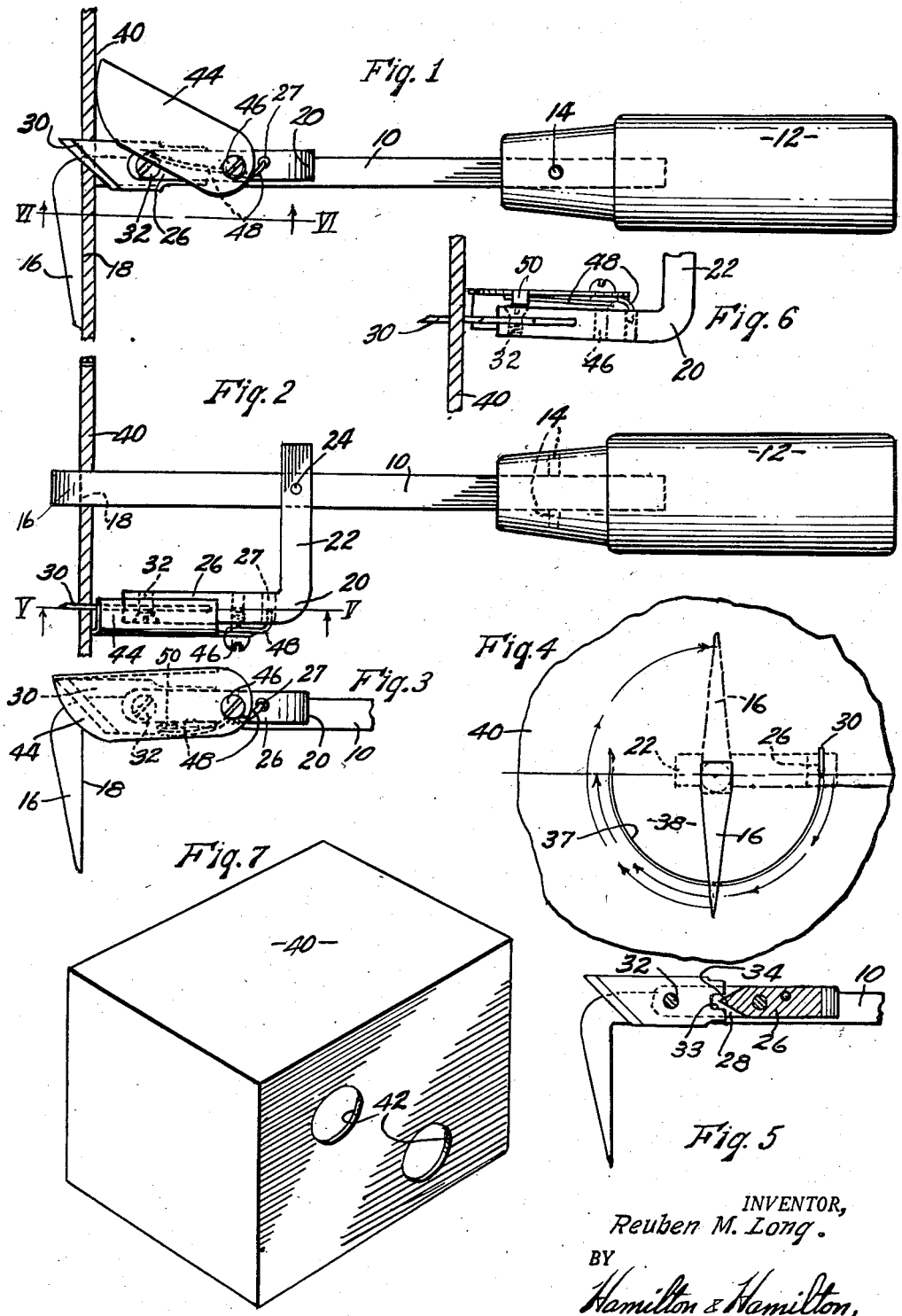
INVENTOR,
Reuben M. Long.
BY
Hamilton & Hamilton,
Attorneys.

United States Patent Office 2,830,369
Patented Apr. 15, 1958

2,830,369

APPARATUS FOR VENTING CARDBOARD CONTAINERS

Reuben M. Long, Kansas City, Mo.

Application March 30, 1955, Serial No. 497,998

2 Claims. (Cl. 30—310)

This invention relates to an apparatus for forming vents in a cardboard container which has been filled with unit servings of beverages for serving cold. These containers are normally packaged and sealed at the factory for sale to the consumer. The consumer places these containers in refrigerators for cooling to the desired degree for consumption. To facilitate more rapid cooling in the refrigerator the purchaser forms vents in the containers to permit free circulation of refrigerated air about the unit servings which are usually placed in cans or bottles.

The principal object of this invention is the provision of a tool which serves to remove a circular member from a cardboard container to form a vent therein.

Other objects of this invention are simplicity and economy of construction, ease and efficiency of operation and adaptability for use with various types of containers.

The accompanying drawing shows an embodiment of my invention.

Fig. 1 is a side elevation of the apparatus shown in operative relation with the container while forming a vent.

Fig. 2 is a plan view of the apparatus as shown in Fig. 1.

Fig. 3 is a fragmentary view of the apparatus with the shield in position to cover the cutting blade.

Fig. 4 is an end elevation of the apparatus shown in operative position in said container and moved through 180° as shown in dotted lines.

Fig. 5 is a sectional view taken on line V—V of Fig. 2.

Fig. 6 is an inverted view taken on line VI—VI of Fig. 1.

Fig. 7 is a perspective view of a cardboard container with a pair of vents formed therein.

Throughout the several views like reference characters refer to similar parts and the numeral 10 designates a body member formed from a square bar and provided at its outer end with a suitable handle 12 which is secured thereto by a transverse pin 14. The inner end portion of body member 10 is formed in angled relation thereto to present a sharpened tongue 16 having an inner surface 18 disposed at a right angle to body member 10. Tongue 16 serves to pierce the container 40 to be vented, being pushed manually therethrough, and after piercing is turned so as to lie against the inner surface of the container wall. In this position, it retains the tool in position as said tool is rotated.

Rigidly carried by body member 10 is a right angled member 20 preferably made of a square bar of the same cross section as body member 10. Member 20 has a leg 22 disposed transversely of body member 10 and mortised thereto and rigidly secured together by spot welding at 24. The other leg 26 of member 20 is disposed in spaced apart and parallel relation to body member 10. This leg 26 is longitudinally slotted at 28 to receive a knife blade 30 which is pivoted for limited movement on flat headed screw 32. The end of blade 30 extending toward handle 12 is recessed at 33 to straddle a V-shaped projection 34 extending into slot 28 and into recess 33 to limit the pivotal movement of blade 30 on screw 32. This mounting of the blade 30 facilitates better adjustment of the blade as it is moved by handle 20 to cut a substantially circular member 38 from said cardboard container 40. Referring to Fig. 4, it will be noted that as the blade 30 is moved by rotating the handle 12 on its axis, the knife will cut a circular groove 37, which when complete will release the circular member 38 to form a round hole or vent 42 in the cardboard container 40. The knife 30 is necessarily very sharp and to protect the operator against accidental injury, a shield 44 is provided to partially cover the knife and prevent the operator from moving into contact with the sharp edge. This shield is pivotally attached to the angled member 20 by means of a screw 46. A coil spring 48 wrapped around screw 46 is anchored at its one end in a hole 27 formed in leg 26 and at its other end to a hook member 50 formed on the inside wall of shield 44. When so mounted this spring will tend to urge the shield downwardly against the top of the knife blade 30 as clearly shown in Fig. 3.

Referring now to Fig. 1 it will be noted that when the apparatus is positioned as shown, the free end of shield 44 will rest against the outside wall 40 of the container and be moved on its pivot screw 46 to tension spring 48 to urge it away from the knife blade 30. When the shield 44 is moved from its position against container 40, the shield will again be forced downwardly by spring 48 to rest on knife blade 30. Since the flat headed screw 32 is used for mounting the knife blade in leg 26, it will be noted that there will be no interference for the free passage of the shield and associated spring thereover.

Having thus described my invention, what I claim and wish to protect by Letters Patent of the United States is:

1. In an apparatus for venting a cardboard container, an elongated, rod-like body member having a handle secured to one end thereof and having its opposite end portion disposed at right angles to the central portion thereof, said angled end portion having its free end sharpened whereby to constitute a finger which may manually be caused to pierce a wall of said container and which will move slidably against the inner surface of said wall when said central body portion is positioned at right angles to said wall and rotated about its axis by manipulation of said handle, a right angled support member having a first leg secured to said central body portion and a second leg secured to said first leg and extending parallel to said central body portion toward the end thereof carrying said finger and a planar elongated knife blade secured at one end to said second leg for limited pivotal movement about an axis generally radially related to said central body portion, said blade extending generally parallel to said central body portion toward the end of said body portion carrying said finger, the plane of said blade being disposed at right angles to the pivotal axis thereof, and the free end of said blade being tapered to a sharp point and having a cutting edge extending from said point along the tapered edge of said blade, said cutting edge extending in both directions from said finger considered longitudinally of said central body portion.

2. The structure as recited in claim 1 with the addition of a blade guard constituting a plate pivoted to the second leg of said support member on an axis parallel to the axis of said blade and normally disposed alongside one face of said blade, and being of sufficient length to overlap the cutting edge of said blade, said guard being pivotally movable in a direction away from the cutting edge of said blade, whereby to expose said cutting edge, and resilient means carried by said second leg and urging said guard in the opposite direction to retain it yieldably in its blade overlapping position.

References Cited in the file of this patent

UNITED STATES PATENTS

| 118,593 | Dewey | Aug. 29, 1871 |
| 586,874 | Simond | July 20, 1897 |
| 1,863,153 | Christopherson | June 14, 1932 |